United States Patent [15] 3,651,268
Rivkin [45] Mar. 21, 1972

[54] COMMUNICATION PRIVACY SYSTEM

[72] Inventor: Bernard W. Rivkin, East Meadow, N.Y.

[73] Assignee: Scrambler and Seismic Sciences, Inc., Hemptead, N.Y.

[22] Filed: Apr. 1, 1969

[21] Appl. No.: 811,795

[52] U.S. Cl. ........................................179/1.5 M, 179/1.5 FS
[51] Int. Cl. ........................................................H04m 1/70
[58] Field of Search......................179/1.5 M, 1.5 FS; 178/22; 325/32, 34

[56] References Cited

UNITED STATES PATENTS 2,400,950 5/1946 Purington ...............................179/1.5
2,870,257 1/1959 Honolka ...............................179/1.5

*Primary Examiner*—Malcolm F. Hubler
*Attorney*—Leonard H. King

[57] ABSTRACT

A communication system which employs masking signals to encode the transmitted signal and means to strip the masking signals at the receiving end. Provision is made for simple, replaceable, plug-in modules which determine the frequency of the masking signals. Provision is made for switching between a multiplicity of masking signals on a random basis. Further, the masking signals are present in the carrier only during transmission of intelligence making detection of the frequencies employed difficult.

16 Claims, 3 Drawing Figures

INVENTOR.
BERNARD W. RIVKIN

BY

Leonard H. King
ATTORNEY

INVENTOR.
BERNARD W. RIVKIN
BY
Leonard H. King
ATTORNEY

COMMUNICATION PRIVACY SYSTEM

This invention relates to communication systems and particularly to arrangements for use with such systems to provide privacy of the transmitted communications.

BACKGROUND OF THE INVENTION

When communications are maintained over transmission lines or radio links, privacy is always in question. Since monitoring devices for use on transmission lines are available the conversation may be readily made accessible to unauthorized persons. A similar situation exists when radio-telephone systems are utilized to maintain a communications link, since an outside person having the required receiving equipment will be able to freely monitor the transmission. In order to afford a degree of privacy for such communication, many systems have been devised which require complicated and often costly equipment. The equipment installed at the sending and receiving terminal is rather elaborate and most times, rather bulky. Consequently privacy systems which have heretofore been developed have been generally limited to military or other technical areas where every item transmitted is of classified nature.

The present invention represents a trade-off between what may be called a foolproof, or unbreakable, privacy system which requires complicated equipment at both the receiving and sending ends, for a system of private communications where an inexpensive, small, compact, portable device can be used in conjunction with conventional communication means such as the telephone and radio-telephone equipment. An inexpensive coding device used at both the sending and receiving ends is extremely desirable. A device which is capable of being carried by a person and utilized in a public telephone booth, for example, to maintain privacy between an individual and his home office, would find great application in many areas of industry. In addition, the ability to maintain a different set of coding systems for each company or home office would again be desirable to avoid the possibility of outsiders being able to utilize similar equipment thereby monitoring or obtaining information which is meant to remain in the hands of a selected individual. The present invention also may be used in conjunction with data handling systems.

Accordingly, it is an object of this invention to provide a low cost, portable means of providing a privacy communication system.

Another object of this invention is to provide a miniature masking device which is usable with present communication techniques.

A further object of this invention is to provide a device for selectively masking a communication so that the sender may communicate with different receiving devices which are selectively coded.

Another object of this invention is to provide a device which can create a private communication system of a substantially miniature size so that it may be incorporated within a conventional telephone instrument and selectively introduced or excluded from the communicated signal at the option of the individual using the instrument.

Additional various objects and features of the invention will be better understood from the following detailed description when read in conjunction with the accompanying drawing.

DESCRIPTION OF THE PREFERRED EMBODIMENT

Figure 1:
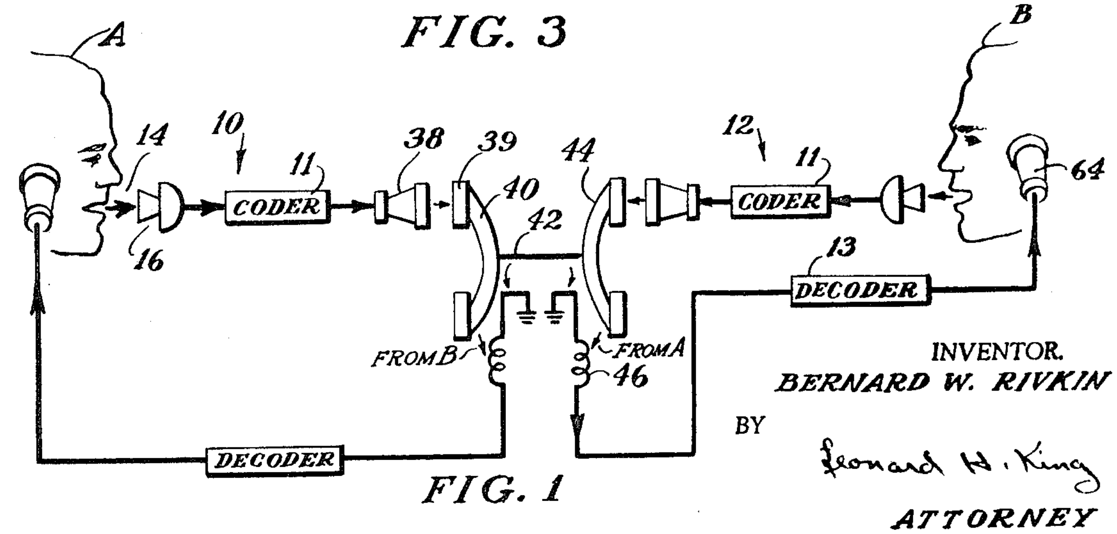
FIG. 1 shows a diagram in generalized form, the communication system of this invention which includes a privacy feature.

In FIG. 1 there is shown in simplified form the transmitting system of this invention designated generally by the numeral 10. Communicator A provides a signal 14 to a microphone 16 which feeds it to a coding unit 11. The encoded signal is then coupled from speaker 38 to the earphone 39 of the conventional telephone company handset 40. The signal is then transmitted over telephone lines 42 to the handset 44 of the receiving station 12 and coupled by means of pickup coil 46 to a decoder 13. The decoded signal is then provided to the ear of communicator B through earphone 64. Direct coupling between the equipment and the transmission line may be employed. It will be appreciated that the transmission may be accomplished by radio link, via satellite, or laser beam, in lieu of the transmission line indicated.

Figure 2:
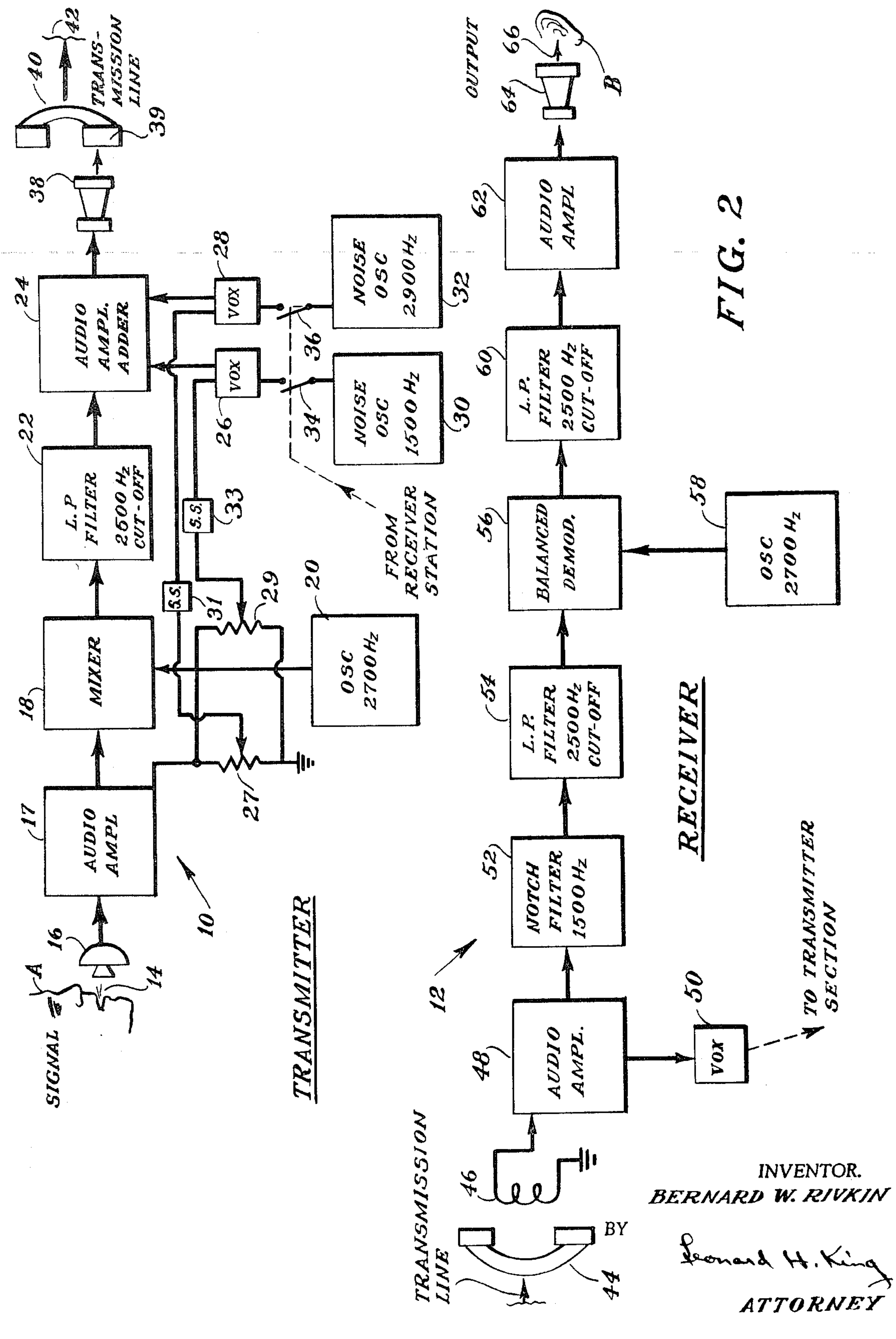
FIG. 2 shows a detailed block diagram of the system of FIG. 1.

Referring now to FIG. 2, the originating signal is generated at the transmitter generally referred to as 10. The signal 14 is impressed at the handset 16 which is a typical handset utilized in telephone receiver instruments. The signal emanating from the handset is fed into an audio amplifier 17, where the signal is increased to the proper level. The signal then is fed into a mixer 18. The mixer circuit 18 has an additional input which is obtained from an oscillator 20. In the present embodiment, oscillator 20 is comprised of a tuning fork which generates a signal of 2,700 Hz. Other types of oscillators such as crystal, RC, etc., would be equally suitable if their stability was maintained. The signal is taken from the mixer where both sum and difference frequencies are generated and a normal modulation pattern is obtained. The signal is then fed to a low pass filter 22 which, in the present embodiment, has a cutoff frequency of approximately 2,500 Hz., removing all frequencies from the signal which are in excess of this value. The signal is then fed to an audio amplifier 24. The output of audio amplifier 24 is fed to a speaker 38 and coupled to microphone 39. Microphone 39 in the present embodiment is similar to that found in a conventional telephone instrument. The audio amplifier 24 has fed into it two additional signals. These two signals are controlled by voice-operated switches 26 and 28 commonly known as "VOX." The voice-operated switches 26 and 28 are supplied respectively by a first noise oscillator 30 which in the present embodiment provides a 1,500 Hz. signal, and a second noise oscillator 32 which provides a 2,900 Hz. signal. In series with the two noise oscillator signals there is incorporated switch contacts 34 and 36 which feed the voice-operated relays 26 and 28, respectively. It is to be understood that although switches 34 and 36 are illustrated in the present embodiment as of the mechanical type, these may be of the solid state type. The normally closed switches 34 and 36 are controlled from a signal which is generated from the receiver portion of the instrument. This will be explained at a later time.

A portion of the output from the audio amplifier 17 is fed to two potentiometers 27 and 29. The wiper arm of each potentiometer is set to a prescribed level and is used to set the conduction bands of the over-under voltage-sensing switches 31 and 33. These switches feed the audio signals to the voice-operated switches 26 and 28, respectively, permitting them to operate when the audio output of amplifier 17 reaches preselected voltage bands, thereby allowing the masking oscillators 30 and 32 to add their frequencies to the audio output signal. The audio signal emanating from transmitting speaker element 38 is then fed into the conventional handset 40 which is part of the telephone instrument in use. The signal thereupon will be transmitted along transmission line 42 until it reaches the receiving instrument 44 which again is a standard handset. In the present embodiment, the receiving instrument 44 is placed in close proximity to pick up coil 46. A microphone and speaker arrangement would be equally suitable. Coil 46 has induced in it the audio frequencies which have been received by the receiving instrument 44. The audio signal is fed into audio amplifier 48 where its output level is raised to the required value. An additional output is taken from audio amplifier 48 to operate a voice-controlled switch 50. This voice-controlled switch operates when an audio signal is received and will open the contacts 34 and 36 on the local transmitter portion of the instrument. This inhibits the noise generators from the transmitting stations from putting noise on the line. However, a masking noise will appear on the transmission line emanating from the receiving station which is now transmitting. The audio signal is then fed into notch filter 52 which is capable of attenuating the 1,500 Hz. which was introduced by the transmitting instrument. The signal then passes through low pass filter 54 which removes the unwanted frequency components above 2,500 Hz.

The signal is then fed into a balanced demodulator 56. A balanced demodulator is used in this application to minimize the introduction of unwanted signals. Other types of modulators could be used for this application with results which would not be optimized. An oscillator 58 which in the present embodiment is of the tuning fork type is fed into the balanced demodulator with the input signal. The signal out of the balance demodulator is now fed into a low pass filter with 2,500 Hz. cutoff frequency which again removes unwanted signals. From there the signal is fed into audio amplifier 62, and then fed to handset 64 where the output signal 66 is of sufficient volume for the listener and is an audio signal equal to or better than the original signal which was inserted at the transmitter end.

Persons desirous of intercepting a private communication would have to capture the signal somewhere along the transmission line 42. The signal that would be captured would be unintelligible and a person would be hard pressed to determine the particular masking technique that was used in the transmission. The amount of time required to obtain the clear audio transmission would be very time consuming and it would require considerable equipment. In addition, since it is possible to modify the noise frequencies inserted, the obtaining of clear text on one particular transmission would not be a valid technique or instrument to obtain clear transmission on a subsequent transmission.

The signal 14 originating from a transmitting station would be conditioned in the following manner: The output of handset 16 is amplified to the proper level by audio amplifier 17. Audio amplifier 17 has threshold setting adjustments which are independently adjustable and control the voltage conduction bands of the sensing switches 31 and 33. These switches permit an audio output only when the audio input level has reached a prescribed voltage band. This audio output will turn on the voice-operated switches 26 and 28, each being set for a different output level. The noise or masking oscillator 30 has its frequency inserted onto the signal only when the input signal reaches the required voltage band level. The noise signal 32 is introduced to the signal when a different voltage band level is reached by the input audio signal. Therefore, a monitoring station would get different results for a different voice signal appearing at the input, depending on the total quality and the amplitude of the audio impressed into the system. Also the masked signal would have a different appearance when emanating from the receive station. The mixer 18 handles the audio input signal with the oscillator 20 in conventional mixing fashion. However, the low pass filter 22 removes all audio frequencies above 2,500 Hz. The input audio frequency range is between 300 Hz. and 2,500 Hz. When mixed with the 2,700 Hz. oscillator, output sum and difference frequencies are obtained. However, when the low pass filter cuts out every frequency above 2,500 Hz., the upper side band is completely removed. Consequently the lower side band is the only signal remaining. The mixer frequency of 2,700 Hz. is also removed. Therefore, the output of the low pass filter consists of a signal which transcribes the 300 Hz. audio tone to 2,400 Hz. and has taken the 2,500 Hz. tones and transcribed them to 200 Hz. This has caused an inverting action. The frequency pass band is now 200 to 2,400 Hz., but is completely different from the original signal which was impressed and if monitored through an audio amplifier and speaker, would be unintelligible. The noise oscillator frequencies are added to this audio signal and are of a magnitude large enough to camouflage or mask the inverted audio signal. Since there is no mixing action here no sum and difference frequencies are introduced. Again, any interception of the signal would be further confused by the fact that the audio noise signal would not be occurring at regular prescribed intervals but would rather occur at random intervals, caused by the input audio signal. Normally closed switches 34 and 36 which are in series with the noise oscillators 30 and 32 open to insure that the noise frequency signals do not get transmitted when a signal is received, since an audio signal appearing in a receiver operates the voice control switch 50'. This of course prevents the transmitting station's noise oscillator frequencies from being on the transmission line for any length of time where accurate measurements could be made to determine their actual value. When the audio signal reaches the receiving hand set 44, it is in substantially the same condition as it left speaker 38, since the transmission line is capable of handling a frequency range of 200 to 2,400 Hz. without distortion. Therefore, the present telephone lines would in no way affect this masking system. It is to be understood, however, that this masking system is not limited to physical transmission lines, but may be incorporated in a radio-telephone system where the transmission line is nothing more than the air waves.

Pickup coil 46 couples the audio energy from hand set 44 and transfers it to audio amplifier 48. Audio amplifier 48 has an output which operates the voice control relay 50 and is identified by reference numeral 50' when located at the station where the transmitter is located. Notch filter 52, being of narrow bandwidth, successfully attenuates the 1,500 Hz. noise signal that was put in. Again I wish to point out that the transmitting noise signal of 1,500 Hz. and noise signal of 2,900 Hz. may be varied and changed at prescribed intervals to further confuse anyone intercepting the signal. The frequency of oscillator 20 must be of very close tolerance with the receiver oscillator 58 in order to effect sufficient demodulation. In addition, the notch filter 52 must always be capable of removing the noise oscillator frequency 30 which would appear in the center of the audio band. Changing the frequency of noise oscillator 32 would not affect the receiver in any manner since low pass filter 54 effectively removes this signal from consideration. A person intercepting the signal, however, could not possibly know where this cutoff filter 54 rolls off and would be hard pressed to obtain any clear intelligence if the signal is intercepted anywhere along the path. Balanced demodulator 56 receiving the signal after it has been processed be low pass filter 54 has fed into it the oscillator frequency 58. The combining of these two signals in normal mixing manner reinverts the signal so that the pass band becomes 300 Hz. and 2,500 Hz. as it was originally impressed upon the system. Again, low pass filter 60 successfully attenuates the upper frequencies leaving only the lower side band which we are concerned with. The 2,700 Hz. of the demodulation oscillator 58 is also removed and does not interfere with the quality of our reproduced signal. Audio amplifier 62 brings the signal level to the proper magnitude for the individual listening at the receiver 64.

A gain control is provided in audio amplifier 62 for the convenience of the person listening to the audio output signal 66.

Figure 3:
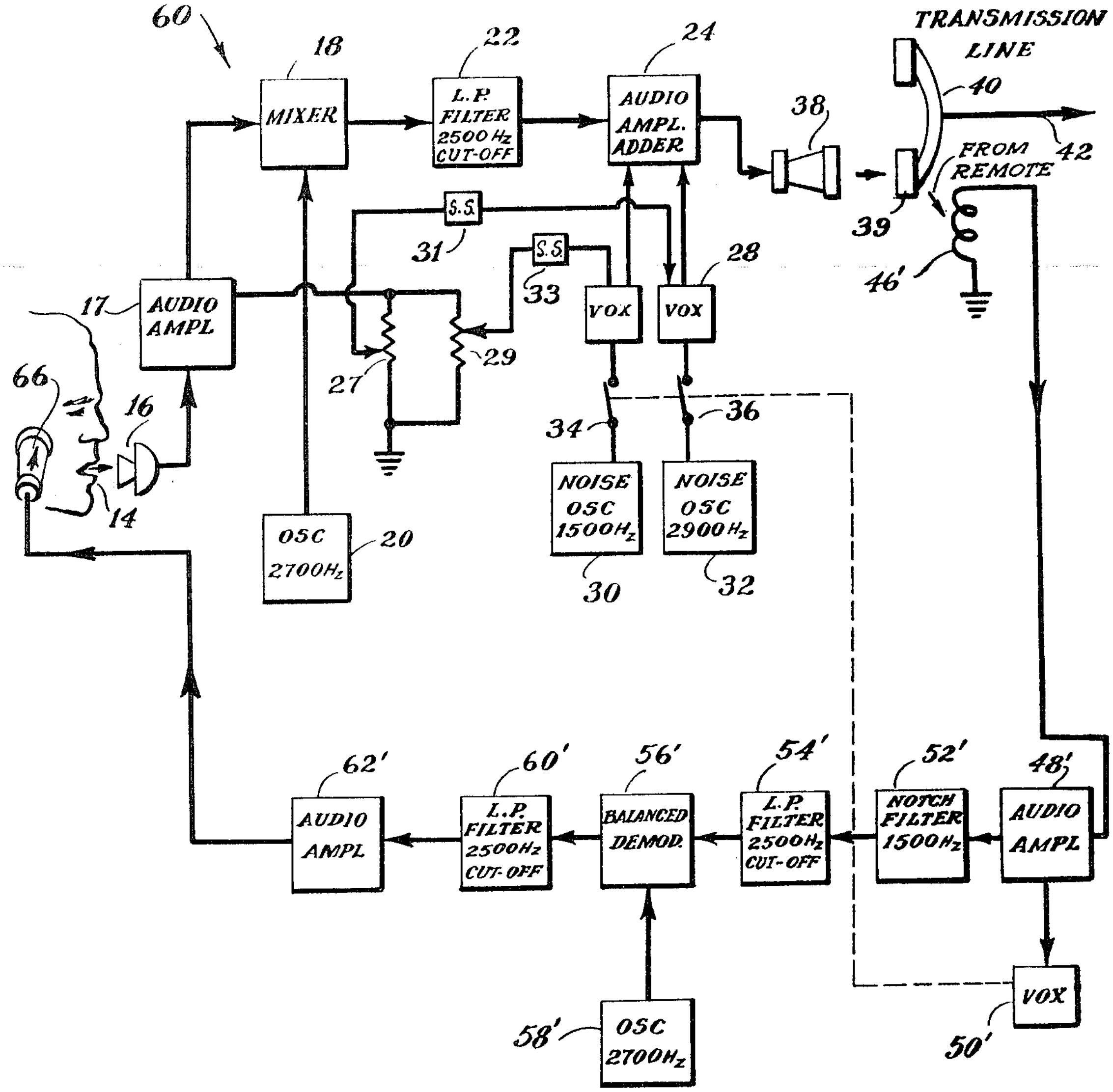
FIG. 3 shows a detailed block diagram of a single terminal of this invention

Referring now to FIG. 3, we can see the composition of an instrument which is located at both the transmitting and receiving ends of the system. The instruments are similar in nature and are small in size. The numerals designated with prime notation are the same as the numerals designated without the prime in FIG. 2. FIG. 2 follows a signal from the source to its destination; FIG. 3 shows the complete terminal instrument and how it would look when placed at the receiving or transmitting ends. The input and output signals 14 and 66, respectively, would be impressed and heard from handset 16. Handset 40 would be the normal telephone handset which is used for present day communications. Handset 40 would be required to be lifted from the instrument and placed in the proper position on the signal conditioning system housing. The communication privacy system may be incorporated directly into the telephone instrument with a switch to enable it to be engaged into the system at the user's command. This would obviate the need for two sets of handsets since the signal could be sent out and received directly from the transmission line without the need for additional audio coupling means.

The signal 14 appearing at handset 16 in FIG. 2 would be processed by audio amplifier 17, mixer 18, low pass filter 22, audio amplifier adder 24, and output device 38 and would be acted upon by the noise oscillators 30 and 32, in the same manner as described in FIG. 2 and would then be sent out on the transmission line. The receiving part responding to the communication and emitting an audio signal would cause pickup coil 46' to be energized by virtue of the audio information appearing in handset 40. The signal, in turn, would be processed by audio amplifier 48'. The signal, in turn, would be processed by audio amplifier 48'. An output from audio amplifier 48', would operate the voice-operated switch 50' opening contacts 34 and 36 which immediately would remove the noise oscillators 30 and 32 from the originating transmitter from appearing on the transmission line. Consequently, the signal appearing on the line from the receiver station, which now becomes a transmitting station, would have a different appearance from the signal which originated form the first transmitting station, again causing much confusion to anyone in the process of intercepting the signal. The notch filter 52' would take out the 1,500 Hz. signal which was impressed at the receiving station, now acting as transmitting station, and the signal would be further processed by the low pass filter 54', balanced demodulator 56', oscillator 58', low pass filter 60', and audio amplifier 62', where the output now from audio amplifier 62' would be fed to handset 16 and would appear as output signal 66. As stated previously, the performance of this receiving instrument is identical to the performance of the instrument depicted in FIG. 1 and appearing at the receiving station.

SUMMARY

Thus there has been disclosed a system for maintaining privacy of communications on either telephone lines or radio links. The system is secured by the use of frequency-generating subsystems which affect a reformation and envelopment of the transmitted intelligence. The noise frequencies and modulation frequencies are controlled by the use of interchangeable modules replaceable under the operator's control without other adjustment. A portable system may contain either switching arrangements or replaceable modules which can be made to communicate with selected predetermined base stations where each base station may have different instruments so that communications between base-to-base stations would result in unintelligible information. Base stations may be provided with auxiliary switching arrangements to permit privacy communications between each other when desired.

It is presently contemplated that the electronic circuits comprise all solid state devices mounted on printed circuit boards which are embedded in destructible body material whereby the material may not be removed without destroying the components within. The replacement modules are likewise solid state and are encapsulated similarly. The components are disbursed between printed circuit boards and modules so that electronic examination of either unit cannot reveal any circuit characteristic. The entire system is contained in a small, self-powered, audio coupled package. Capturing of a set of devices by unauthorized persons would not make the communication system unusable since the only requirement necessary to maintain security would be to change frequency of the modulating oscillator 20 and the noise oscillator 30 and 32, if desirable, and replace notch filter 52' so that it now becomes compatible with the noise oscillator 30 and replacing demodulation oscillator 58' with a module which is identical to oscillator 20. The number of noise oscillators which may be utilized is not limited to one in the pass band and one slightly above the pass band. Several different oscillators may be incorporated in the pass band and above the pass band in the same manner as the two described herein. The complexity of the notch filters, therefore, would become greater to obtain proper demodulation and the complexity of the equipment would increase. However, the ability to increase the difficulty of obtaining clear text by unauthorized persons would also be made more difficult.

It is also to be pointed out again that the method of coupling the noise oscillator into the circuit is not a conventional mixing action which produces both sum and difference frequencies, but rather a linear summing action where one signal is added to the other and does not produce the sum and difference frequencies. This effectively masks the audio intelligence without introducing additional side bands. Throughout the send and receive path, the various stages of filtering and amplification provide a quality of communication equal to or better than the original signal generated without the use of this privacy system.

It is to be understood that different masking and mixer frequencies may be used at the two terminals to further confuse the intruder. For example, assume one terminal 10 with its transmitting section having the proper mating noise sources and filtering to match the receiving section of a second terminal 12; the second terminal 12 conversely having its transmitter section mated with the receiver section of terminal 10. The transmitting section associated with terminal 10 may have an oscillator stage set at 2,500 Hz. and a low pass filter with a cutoff at 2,300 Hz. and noise oscillator operating at 1,300 Hz. and 2,700 Hz., respectively, with the receiver section of terminal 12 being arranged to receive and handle these frequencies. The transmitting section of terminal 12 may have its oscillator stage and associated noise sources set at the frequencies indicated heretofore and the receiving section of terminal 10 being arranged to receive and unmask the signals. As a result, the intruder would have a multiplicity of frequencies to deal with as they appear in the random pattern of normal speech communication.

The change in transmitting noise signal frequencies can be done integrally in a more complex unit by either time, voltage change or other keying systems to provide a constantly shifting mask camouflage. Further, a number of masking signals greater than two may be employed.

It is desirable to set the level of transmission of the noise sources at a higher amplitude than the audio information to further submerge the intelligence.

Other modifications of the circuits illustrated and described which are in the spirit and scope of the invention can occur to persons skilled in the art.

What I claim as new and desire to secure by letters patent is:

1. A communication system for signal waves comprising at least two stations, each with a transmitting section and a receiving section, connected by a wave transmission medium, said transmitting section comprising:

a. means for inverting an information signal;

b. means for selectively masking said information signal by the linear addition of at least one unmodulated noise signal at pseudo-random intervals of transmission, said intervals controlled by a characteristic of said information signal;

c. means for transmitting said resulting masked signal through a media;

said receiving section comprising:

d. means for unmasking said masked signal;

e. means for reinverting the inverted information signal;

f. means for making the resulting information signal audible.

2. The communication system of claim 1 wherein the means for inverting the information signal comprises:

a. a first amplifier arranged to receive and amplify the input signal waves, $f_s$;

b. a first oscillator for providing a signal, $f_m$;

c. a mixer arranged to receive the outputs of said amplifier and said oscillator to nonlinearly mix the two signals; and d. a first low pass filter connected to the output of said mixer for removing frequency components $f_{21\ m}$ and $(f_m+f_s)$ and passing frequency components $(f_m-f_s)$.

3. The communication system of claim 2 wherein the means for masking said information signal comprises:

a. a second oscillator for providing an unmodulated noise signal $f_{n_1}$;

b. means for linearly summing said noise signal $f_{n_1}$ and the output of said first low pass filter;

c. means for gating the output of said second oscillator to said summing means;

d. control means responsive to the pseudorandom variations in amplitude of the information signal controlling the gating of said gating means when said amplitude is within a predetermined range of values;

e. a second amplifier arranged to amplify the output of said summing means comprising frequency components $[f_{n_1}+(f_m-f_s)]$; and f. means for coupling the resulting output signal of said second amplifier to transmitting means.

4. The communication system of claim 3 wherein the means for unmasking said masked signal comprises:

a. a third amplifier arranged to couple and amplify the resulting output signal from said transmission medium;

b. a notch filter arranged to receive signals from said third amplifier and remove signals of frequency components, $f_{n_1}$ and passing signals of frequency components $(f_m-f_s)$; and c. a second low pass filter arranged to receive signals from said notch filter and remove signals of frequency components above $(f_m-f_s)$.

5. The communication system of claim 4 wherein the means for reinverting the inverted information signal comprises:

a. a second oscillator of frequency $f_m$;

b. a demodulator arranged to receive the output signal from the second low pass filter and the output of the second oscillator;

c. a third low pass filter arranged to receive signals from said demodulator for passing frequency components below $f_m$;

d. means for coupling the resulting unmasked signal from the third low pass filter to an output means.

6. The communication system of claim 3 wherein said information signal is an audio frequency.

7. The signaling system of claim 1 wherein the resulting sum of the information signal and the noise signal, when intercepted by a conventional receiver will reveal only the presence of the noise signal.

8. The communication system of claim 1 wherein said sections are plug-in modules which are readily removable.

9. The communication system of claim 1 including means for disabling the noise signal of the receiving station's transmitting section when said receiving station is receiving a signal from another station.

10. The communication system of claim 1 including a plurality of stations and further comprising means for selectively interconnecting specific ones of said stations in operational relationship with each other.

11. The communication system of claim 10 wherein said means for selectively interconnecting is a switching means.

12. The communication system of claim 1 wherein said means for masking comprises:

a. a plurality of oscillating means each providing an unmodulated noise signal of a different frequency;

b. means for linearly summing a noise signal and said inverted information signal;

c. control means responsive to the pseudorandom amplitude variations of the information signal, detecting when said amplitude is within predetermined ranges of values and generating different control signals for each of said ranges detected; and d. gating means capable of gating specified ones of said noise signals to said summing means in response to each of said different control signals.

13. The communication system as in claim 1 wherein said characteristic is the frequency of said information signal.

14. A communication system for signal waves comprising at least two stations, each with a transmitting section and a receiving section, connected by a wave transmission medium; said transmitting section comprising:

a. a first amplifier arranged to receive and amplify the input signal waves, $f_s$;

b. a first oscillator for providing a signal, $f_m$;

c. a mixer arranged to receive the outputs of said amplifier and said oscillator to mix the two signals;

d. a first low pass filter connected to the output of said mixer for removing frequency components $f_m$ and $(f_m+f_s)$ and passing frequency components $(f_m-f_s)$;

e. a second oscillator for providing a signal, $f_{n_1}$;

f. summing means for linearly combining the output of said first low pass filter with the output of said second oscillator;

g. a switch for selectively connecting the output of said second oscillator to said summing means;

h. control means for selectively controlling the opening and closing of said switch responsive to a predetermined range of input signal, $f_s$;

i. a second amplifier arranged to amplify the output of said summing means comprising frequency components $[f_n+(f_m-f_s)]$;

j. coupling means for coupling the output of said second amplifier to the transmission medium; and said receiving section comprising:

k. a third amplifier arranged to couple and amplify signals from said transmission medium;

l. a notch filter arranged to receive signals from said third amplifier and remove signals of frequency components, $f_n$ and passing signals of frequency components $(f_m-f_s)$;

m. a second low pass filter arranged to receive signals form said notch filter and remove signals of frequency components above $(f_m-f_s)$;

n. a second oscillator of frequency $f_m$;

o. a demodulator arranged to receive the output signal from the second low pass filter and the output of the second oscillator;

p. a third low pass filter arranged to receive signals from said demodulator for passing frequency components below $f_m$;

q. means to couple the decoded audio signal from the third low pass filter to an output means.

15. A signaling system for transmitting an audio information signal comprising:

a. means for frequency inverting the audio information signal by the addition of a first reference oscillator signal of frequency $(f_m)$ while maintaining the same audio bandwidth;

b. means for removing the resulting upper side band frequency signals;

c. means for selectively summing an unmodulated audio noise signal and the remaining signal at pseudorandom intervals of transmission, said intervals controlled by a characteristic of said audio information signal, said noise signal being of a magnitude sufficient to mask said audio information signal;

d. means for transmitting said resulting masked signal through a media;

e. means for receiving said resulting masked signal;

f. means for removing said audio noise signal;

g. means for reinverting said audio information signals with the aid of a second reference oscillator of frequency, $f_m$;

h. means for removing the unwanted upper side band frequencies; and i. means for making the audio information signal audible.

16. In a signaling system the method of coding the transmitted signal and decoding the received signal comprising:

a. generating an audio information signal;

b. inverting said signal by mixing with an oscillator signal and maintaining the original bandwidth;

c. removing the upper side band frequencies of the resulting signal;

d. pseudo-randomly summing linearly and selectively an unmodulated audio noise signal with the resulting signal said summing being dependent upon the amplitude of said audio information signal being within a predetermined range and said noise signal being of sufficient magnitude to effectively mask said audio information signal;

e. transmitting the inverted and masked signal through a media;

f. receiving said inverted and masked signal;

g. removing said audio noise signal;

h. reinverting said audio information signal with the aid of a second reference oscillator;

i. removing the unwanted upper side band frequencies; and j. making the audio information signals audible.

* * * * *